United States Patent
Szwed et al.

(10) Patent No.: US 11,301,277 B2
(45) Date of Patent: Apr. 12, 2022

(54) CHANNEL IDENTIFIER COUPLING WITH VIRTUALIZED COMMUNICATIONS HARDWARE

(71) Applicant: International Business Machines Corporation, Armonk, NY (US)

(72) Inventors: Peter Kenneth Szwed, Rhinebeck, NY (US); Michael Peter Lyons, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 16/672,577

(22) Filed: Nov. 4, 2019

(65) Prior Publication Data
US 2021/0132971 A1    May 6, 2021

(51) Int. Cl.
*G06F 9/455*    (2018.01)
*G06F 9/50*    (2006.01)

(52) U.S. Cl.
CPC ...... *G06F 9/45545* (2013.01); *G06F 9/45558* (2013.01); *G06F 9/5022* (2013.01); *G06F 9/5077* (2013.01); *G06F 2009/45579* (2013.01); *G06F 2009/45595* (2013.01)

(58) Field of Classification Search
CPC ............. G06F 9/45545; G06F 9/45558; G06F 9/5022; G06F 9/5077; G06F 2009/45579; G06F 2009/45595
See application file for complete search history.

(56) References Cited

U.S. PATENT DOCUMENTS

| 8,122,225 B2 | 2/2012 | Recio et al. |
| 8,176,207 B2 | 5/2012 | Solomon et al. |
| 8,495,252 B2 | 7/2013 | Lais et al. |

(Continued)

FOREIGN PATENT DOCUMENTS

| CN | 101452692 A | 6/2009 |
| CN | 109062671 A | 12/2018 |

OTHER PUBLICATIONS

Bhosale, S. et al. "IBM Power Systems SR-IOV: Technical Overview and Introduction", IBM International Technical Support Organization, Jul. 2014, REDP-5065-00, 86 Pages.

(Continued)

*Primary Examiner* — Dong U Kim
(74) *Attorney, Agent, or Firm* — Cantor Colburn LLP; Edward Wixted

(57) ABSTRACT

Embodiments include a method of organizing communications channels associated with virtual functions of a single root input and output virtualization (SR-IOV) adaptor. The method includes organizing a first coupling channel according to a first channel path identifier bound to designated communications over a first virtual function of the SR-IOV adaptor allocated according to first virtual function resources that support the first coupling channel. The method also includes enabling access to the first coupling channel to a first guest operating system. The method also includes receiving a teardown command associated with the first coupling channel. The method further includes initiating a reset of the first virtual function that deallocates the first virtual function resources associated the first virtual function.

18 Claims, 3 Drawing Sheets

(56) References Cited

U.S. PATENT DOCUMENTS

| | | | |
|---|---|---|---|
| 9,317,317 | B2 | 4/2016 | Graham et al. |
| 9,459,905 | B2 | 10/2016 | Anand et al. |
| 9,734,096 | B2 | 8/2017 | Lee et al. |
| 9,778,989 | B2 | 10/2017 | Arroyo et al. |
| 10,157,074 | B2 | 12/2018 | Khemani |
| 2011/0179414 | A1* | 7/2011 | Goggin .............. G06F 9/45533 718/1 |
| 2012/0192178 | A1* | 7/2012 | Brownlow .......... G06F 9/45558 718/1 |
| 2014/0372794 | A1 | 12/2014 | Graham et al. |
| 2017/0177396 | A1* | 6/2017 | Palermo ................. H04L 49/70 |
| 2018/0157496 | A1* | 6/2018 | Eide .................... G06F 9/45558 |
| 2019/0101899 | A1 | 4/2019 | Enver |

OTHER PUBLICATIONS

SR-IOV Architecture—Windows drivers | Microsoft Docs. Date Posted: Apr. 19, 2017. Retrieved from https://docs.microsoft.com/en-us/windows-hardware/drivers/network/sr-iov-architecture on Oct. 28, 2019. 3 Pages.

Zhang, J. et al. "Slurm-V: Extending Slurm for Building Efficient HPC Cloud with SR-IOV and IVShmem", Proceedings of the 22nd International Conference on Euro-Par 2016: Parallel Processing; vol. 9833, Aug. 24-26, 2016, pp. 349-362.

Mbongue, J. et al. "FPGAVirt: A Novel Virtualization Framework for FPGAs in the Cloud", IEEE 11th Conference on Cloud Computing, 2018, pp. 862-865.

Friedman, M. et al. "IBM Data Center Networking: Planning for Virtualization and Cloud Computing", IBM International Technical Support Organization, May 2011, SG24-7928-00, 260 Pages.

* cited by examiner

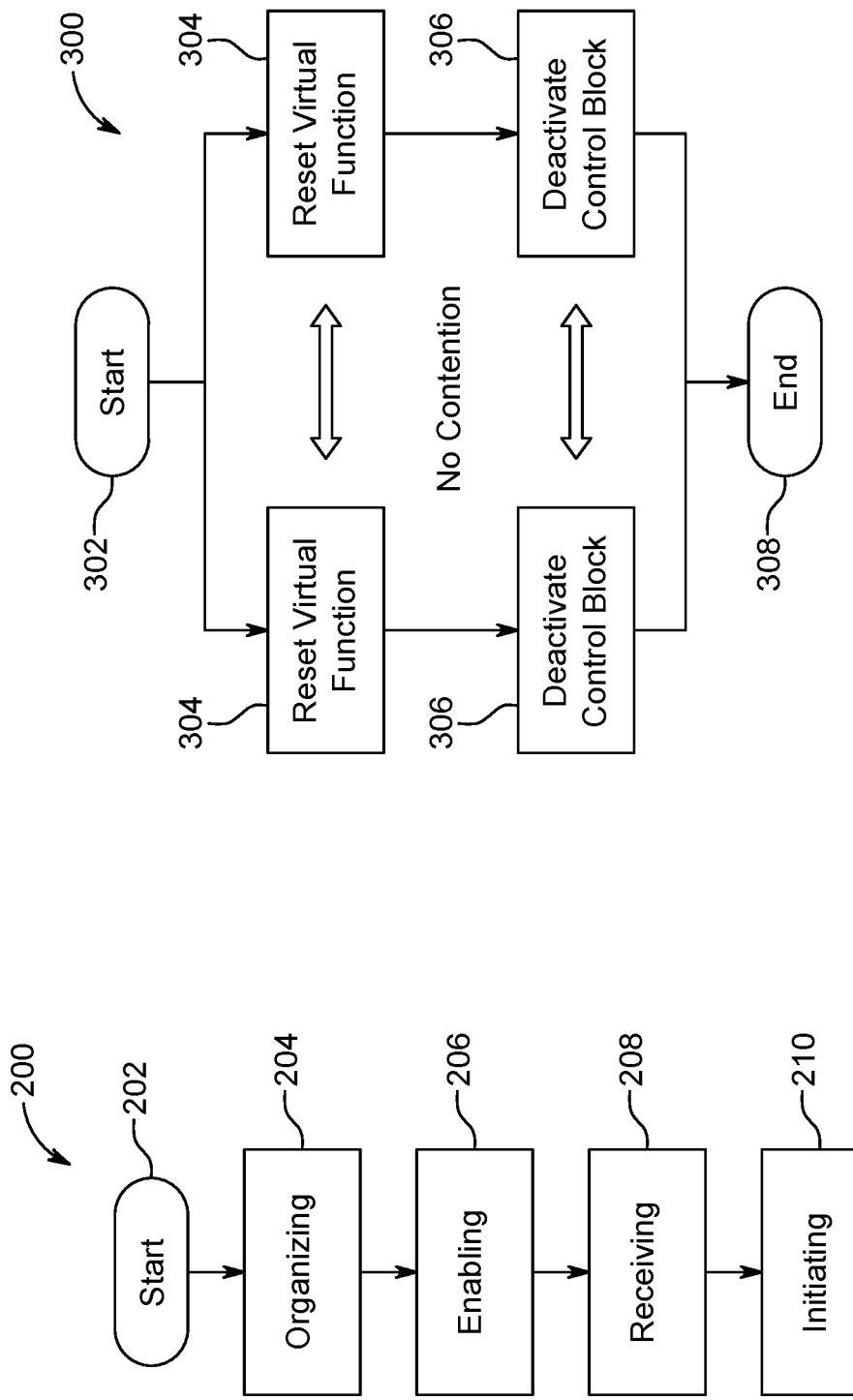

CHANNEL IDENTIFIER COUPLING WITH VIRTUALIZED COMMUNICATIONS HARDWARE

BACKGROUND

The present invention relates to cloud-computing communications, and more specifically, to channel identifier coupling with virtualized communications hardware.

SUMMARY

Embodiments of the present invention are directed to methods, systems, circuitry, and products for virtualization of communications hardware. A non-limiting example computer program product for managing operating systems of a computer to organize communications channels associated with virtual functions of a single root input and output virtualization (SR-IOV) adaptor includes a digital storage device. The computer program product also includes a hypervisor program stored on the digital storage device in computer readable form, the hypervisor program being operable upon execution by the computer to organize a first coupling channel according to a first channel path identifier bound to designated communications over a first virtual function of the SR-IOV adaptor allocated according to first virtual function resources that support the first coupling channel. The hypervisor program is further operable upon execution by the computer to enable access by a first guest operating system to the first coupling channel. The hypervisor program is further operable to initiate a reset of the first virtual function that deallocates the first virtual function resources associated with the first virtual function. The initiation is performed in response to receiving a teardown command associated with the first coupling channel.

Embodiments also include a method of organizing communications channels associated with virtual functions of a single root input and output virtualization (SR-IOV) adaptor. The method includes organizing a first coupling channel according to a first channel path identifier bound to designated communications over a first virtual function of the SR-IOV adaptor allocated according to first virtual function resources that support the first coupling channel. The method includes enabling access to the first coupling channel to a first guest operating system. The method includes receiving a teardown command associated with the first coupling channel. The method includes initiating a reset of the first virtual function that deallocates the first virtual function resources associated the first virtual function.

Embodiments further include a mainframe system of interconnected computing systems organized to have distributed guest operating systems. The mainframe system comprises a single root input and output virtualization (SR-IOV) adaptor that cooperates through a physical function with the mainframe system. The SR-IOV adaptor that cooperates through virtual functions with the distributed guest operating systems. The virtual functions include a first virtual function of the virtual functions allocated according to first virtual function resources of the SR-IOV adaptor that support a first coupling channel defined by a first channel path identifier. The virtual functions include a second virtual function of the virtual functions allocated according to second virtual function resources of the SR-IOV adaptor that support a second coupling channel defined by a second channel path identifier. The mainframe system comprises a hypervisor program stored on the mainframe system in mainframe system readable form. The hypervisor program is operable upon execution by the mainframe system to enable access by a first guest operating system and a second guest operating system of the distributed guest operating systems to the first coupling channel and the second coupling channel. The hypervisor program is further operable upon execution by the mainframe system to initiate a reset of the first virtual function that deallocates the first virtual function resources associated the first virtual function. The initiation is upon receipt of a teardown command associated with the first coupling channel.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 illustrates a flow diagram of a process for organizing communications channels in accordance with one or more embodiments of the present invention; and FIG. 4 illustrates a process for resetting virtual functions of an adaptor without contention in accordance with one or more embodiments of the present invention.

DETAILED DESCRIPTION

One or more embodiments of the present invention map coupling channel identifiers to virtual functions. This application of the one or more embodiments may reduce the overall complexity of coupling channel operations, including teardown operations. In continuing with a very generic and non-limiting example, channel subsystems (CSSs) for IBM® z/OS® designate independent addressable paths that are accessible to specified logical partitions (LPARs) and provide input and output isolation within the z/OS®. Coupling channels may be designated to a specific CSS identifier and channel path identifier. Coupling channels represent a collection of resources that allow for communication between a z/OS® and coupling facility instances. As an example, the CSS may be associated with 128 main communication pathways or operations and auxiliary and management pathways for administrative work. Channel path identifiers may be further associated with adapters and ports within the z/OS®. Channel path identification may include any identifier associated with channels that may be referred to as channel identification or channel path identification.

During initialization, a lengthy process is needed to initialize the adapters, ports, and channel resources. The process is often complicated by having resources allocated to specific channels or channel path identifiers, requiring tracking of the resources. Dynamic operations, including removing the adapter, changing channels, and disabling the port, can contain lengthy evolutions. Limited administrative resources require the dynamic operations to compete or share time in the interface without interfering with higher layer protocols. If multiple channels go through operations on these administrative resources at the same time contention interferes and queuing logic is required to organize and facilitate processing.

Figure 1:
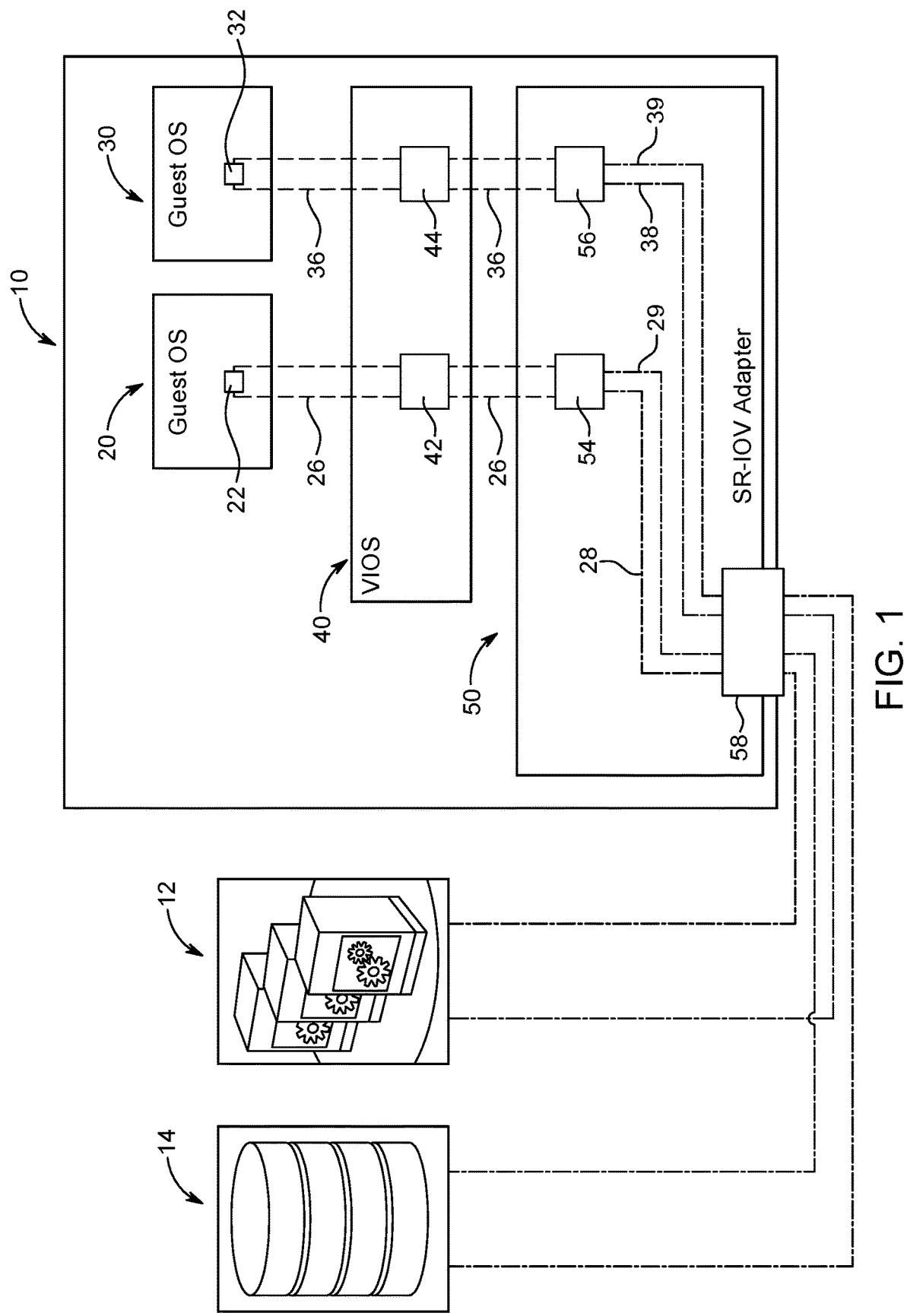
FIG. 1 illustrates a block diagram of components of a mainframe system having guest operating systems associated with virtual functions.

Turning now to FIG. 1, a block diagram of generic components of a mainframe system 10 having guest operating systems associated with virtual functions is generally shown. The mainframe system 10 may be associated or communicatively networked and clustered with mainframe clusters 12 and data repositories 14. As shown in FIG. 1, the mainframe system 10 includes two guest operating systems 20, 30. The guest operating systems 20, 30 are provided with ports 22, 32, generating links 26, 36. and drivers 42, 44 provided by a virtual input and output server (VIOS) 40. Each of the drivers 42, 44 are associated with virtual functions 54, 56 of the single root input and output virtualization (SR-IOV) adapter. As such, each of the guest operating systems 20, 30 are associated with respective virtual functions 54, 56. The guest operating systems 20, 30 may include respective channels 28, 29 and 38, 39 having allocated resources on respective virtual functions 54, 56. The channels 28, 29 and 38, 39 may have different channel path identifiers even though they are communicating on the same respective virtual functions 54, 56. As an example, channel 28 may have a different channel path identifier than channel 29 and communicate on virtual function 54, causing teardown commands associated with the channel path identifier to be done by the driver 42 (e.g., deallocation of channel resources associated with the virtual function 54 by the driver 42) and not by the adapter 50 having physical port 58.

Figure 2:
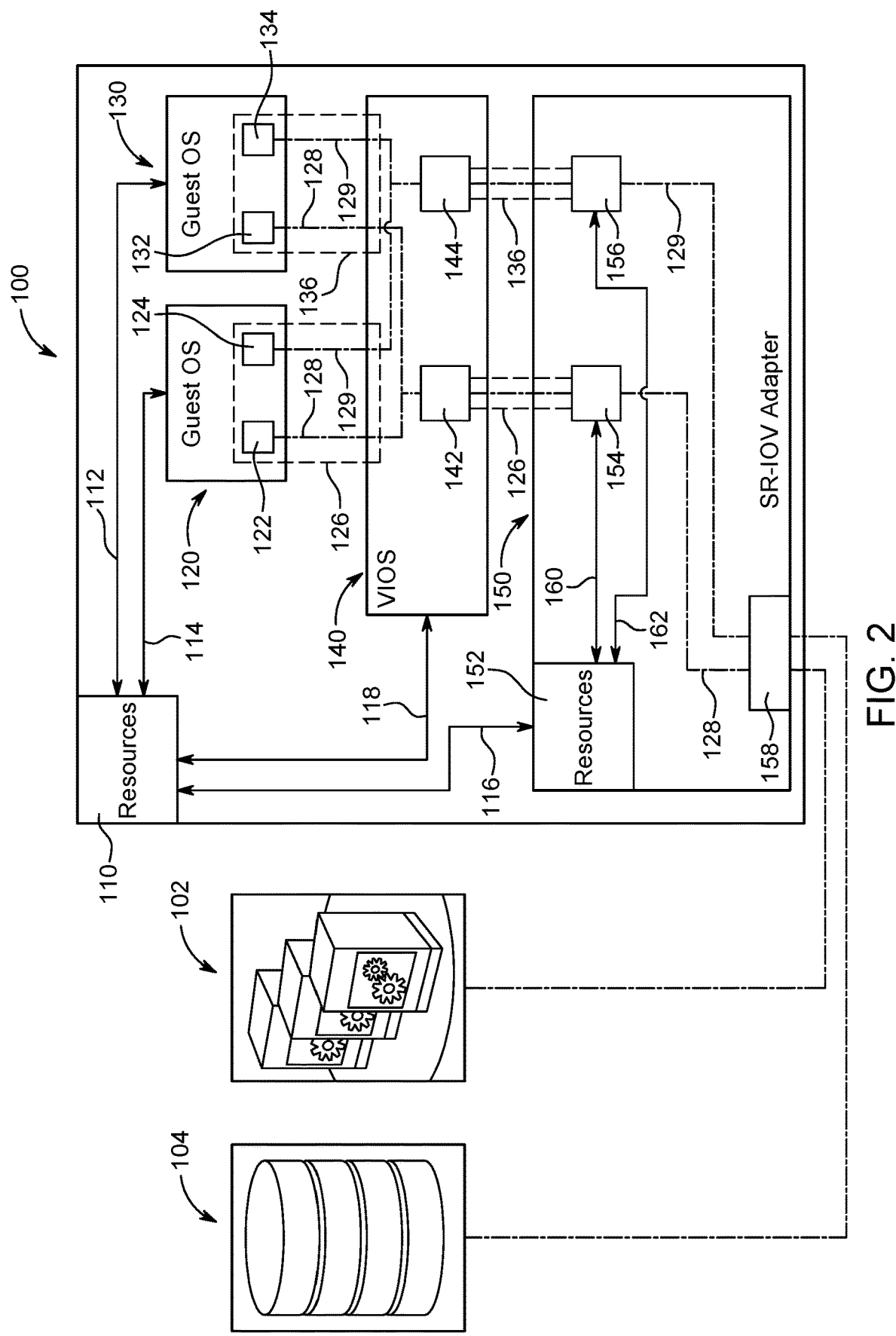
FIG. 2 illustrates a block diagram of components of a mainframe system having channel path identifiers associated with virtual functions in accordance with one or more embodiments of the present invention.

Turning to FIG. 2, a mainframe system 100 is generally shown in accordance with one or more embodiments of the present invention. The mainframe system 100 may include any number of computing systems, computers, processors, memory arrays, storage systems, input and output (IO) systems, and human interfaces. The mainframe system 100 may be a cloud-computing system, distributed computing system, hybrid computing system, a computer, or any other combination thereof. Mainframe systems 100 are often provided to undertake various computing tasks that may include analytics, storage, file service, or other data center tasks. The mainframe system 100 may be associated or communicatively networked and clustered with mainframe clusters 102 and data repositories 104. The mainframe system 100 includes mainframe resources 110. The mainframe resources 110 may include various processing, memory, and circuitry implements provided to logical partitions and operating systems associated therewith. As an example, the mainframe resources 110 may include a processor including processing cores associated with memory arrays, the processor and memory arrays having portions or percentages allocated with logical partitions and a plurality of guest operating systems 120, 130 of the mainframe system 100. Mainframe resource links 112, 114, 116, 118 show the intended sharing of mainframe resources 110 to operating systems and partitions.

The first guest operating system 120 and second guest operating system 130 are first and second by designation only. First and second may correspond to any of the guest operating systems 120, 130 depicted. The guest operating systems 120, 130 may be referred to as logical partitions (LPARs) or portions of LPARs. The guest operating systems 120, 130 may correspond with mainframe resources 110 of the mainframe system 100. As an example, the first guest operating system 120 may be associated with a number of processing cores, memory arrays, or disk partitions. The second guest operating system 130 may be associated with portions of those processing cores, memory arrays, and disk partitions, and the second guest operating system 130 may be provided with additional processing cores, memory arrays, and disk partitions.

A virtual input and output server (VIOS) may be implemented on the mainframe system 100 as a hypervisor program 140 or in association with a hypervisor program 140. The VIOS facilitates the sharing of the mainframe resources 110 with the guest operating systems 120, 130. The VIOS may have drivers 142, 144 associated with the guest operating systems 120, 130. The drivers 142, 144 may be configured to enable communications between the guest operating systems 120, 130 and a single root input and output virtualization (SR-IOV) adapter 150. The drivers 142, 144 may enable a first virtual port 122 and a second virtual port 124 on the first guest operating system 120. The drivers 142, 144 may enable a first virtual port 132 and a second virtual port 134 on the second guest operating system 130, generating the first guest operating system link 126 and the second guest operating system link 136. The first virtual ports 122, 132 form the first plurality of virtual ports 122, 132 and the second virtual ports 124, 134 form the second plurality of virtual ports 124, 134. The drivers 142, 144 may be device drivers to directly allow guest operating system 120, 130 access to the virtual functions 154, 156 of the SR-IOV adapter 150. The drivers 142, 144 may be any program that allows interaction with the SR-IOV adapter 150.

The SR-IOV adapter 150 may be any type of adapter configured to provide guest operating systems 120, 130 access to physical resources of the mainframe system 100. As an example, the SR-IOV adapter 150 may be an integrated virtual ethernet with a host ethernet adapter. The SR-IVO adapter 150 includes a physical port 158. The SR-IOV adapter 150 may be associated with the VIOS by physical functions. The physical functions my correspond with virtual ports and a switch on the SR-IOV adaptor 150 that interacts with the physical port 158. The SR-IOV adaptor 150 also includes adaptor resources 152. The virtual functions 154, 156 may correspond with adaptor resources 152 of the SR-IOV adaptor 150. As an example, the first virtual function 154 may be associated with a number of processing cores, memory arrays, or disk partitions. The second virtual function 156 may be associated with portions of those processing cores, memory arrays, and disk partitions, and the second virtual function 156 may be provided with additional processing cores, memory arrays, and disk partitions. The SR-IOV adapter 150 may allocate first virtual function resources 160 with the first virtual function 154. The SR-IOV adapter 150 may allocate second virtual function resources 162 with the second virtual function 156.

The hypervisor program 140 may be stored on a digital storage device. The digital storage device may be a portion of the mainframe resources 110 associated with the mainframe system 100. The digital storage device may be any implement configured to store digital data (e.g., TRUE-FALSE logic). The digital storage device may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. The hypervisor program 140 or machine instructions may be stored (e.g., stored instructions, stored machine instructions, stored steps) in any language or representation, including but not limited to machine code, assembly instructions, and higher-level programming languages.

In accordance with one or more embodiments of the present invention, the hypervisor program 140 is operable to organize a first coupling channel 128 according to driver 142. The first coupling channel 128 may be associated with a first channel path identifier. The first channel path identifier may be a handle for facilitating communications between the guest operating systems 120, 130, the mainframe system 100, the server or mainframe clusters 102, data repositories 104, or other components. The channel path identifier may be any format, including strings, numbers, or other characters. The channel path identifier may be numerical (e.g., channel path ID 216). The channel path identifier may be unique and presented as a hash or other algorithmic result. The channels may be part of a larger channel subsystem. The channel subsystem may enable asynchronous communications from the mainframe system 100.

In accordance with one or more embodiments of the present invention, the first driver 142 or the hypervisor program 140 binds the first coupling channel 128 to the first virtual function 154 of the SR-IOV adaptor 150. As such, communications associated with the first channel path identifier are handled by the first virtual function 154, connecting the first guest operating system 120 access to the virtual function 154. The second guest operating system 130 may include the first coupling channel 128 defined by the same channel path identifier (e.g., the first channel path identifier). As such, the first coupling channel 128 is bound by the first channel path identifier to the first driver 142. Binding may be specified in a control block file (e.g., text file) that specifies control blocks or entries (e.g., logical designations) for controlling coupling channels 128, 129. Each of the coupling channels 128, 129 may be associated with the channel path identifier in the control block file. The channel path identifier associated with the first coupling channel 128 may correspond with a communications channel associated with the mainframe clusters 102. The channel path identifier associated with the second coupling channel 129 may correspond with a communications channel associated with the data repositories 104.

The hypervisor program 140 may receive a teardown command. The teardown command may be received from one or more of the guest operating systems 120, 130. The teardown command may include or be used to determine the channel path identifier associated with virtual functions 154, 156 requiring termination. The hypervisor program 140 initiates a reset by communicating with the SR-IOV adapter 150 to deallocate resources associated with the virtual functions 154, 156 requiring teardown. As an example, functions such as realloc( ) or free( ) may be used to deallocate resources associated with the first virtual function 154. The mainframe system 100 may have direct memory access (DMA) with the SR-IOV adapter 150 and require deallocation of mainframe resources 110 as well. The reset may cause the first virtual function 154 to close the first coupling channel 128 and other first coupling channels having the same channel path identification. The initiated reset maintains the second virtual function 156 and all of the resources associated therewith.

In accordance with one or more embodiments of the present invention, the hypervisor program 140 is operable to organize a second coupling channel 129 according to driver 144. The second coupling channel 129 may be associated with a second channel path identifier. The second channel path identifier may be a handle for facilitating communications between the guest operating systems 120, 130, the mainframe system 100, the mainframe clusters 102, data repositories 104, or other components. The second channel path identifier may be any format, including strings, numbers, or other characters. The second channel path identifier may be numerical (e.g., channel path ID 216). The channels may be part of a larger channel subsystem. The channel subsystem may enable asynchronous communications from the mainframe system 100.

The second driver 144 or the hypervisor program 140 binds the second coupling channel 129 to the first virtual function 154 of the SR-IOV adaptor 150. As such, communications associated with the second channel path identifier are handled by the first virtual function 154, connecting the first guest operating system 120 access to the virtual function 154. The second guest operating system 130 may include a second coupling channel 129 defined by the second channel path identifier (e.g., the second channel path identifier). As such, the second coupling channel 129 is bound by the second channel path identifier to the second driver 144.

The hypervisor program 140 may receive a teardown command. The teardown command may be received from one or more of the guest operating systems 120, 130. The teardown command may include or be used to determine the channel path identifier associated with virtual functions 154, 156 requiring termination. The hypervisor program 140 initiates a reset by communicating with the SR-IOV adapter 150 to deallocate resources associated with the virtual functions 154, 156 requiring teardown. As an example, functions such as realloc( ) or free( ) may be used to deallocate resources associated with the first virtual function 154. The mainframe system 100 may have direct memory access (DMA) with the SR-IOV adapter 150 and require deallocation of mainframe resources 110 as well. The reset causes the second virtual function 156 to close the second coupling channel 129. The initiated reset maintains the first virtual function 154 and all of the resources associated therewith.

Moving to FIG. 3, a method 200 in accordance with one or more embodiments of the present invention is shown. Method 200 is a process for organizing communications channels. The process may take place on any implement, including any combination of processors, field programmable gate arrays (FPGA), or application specific integrated circuits (ASIC). The combination may include memory, volatile and non-volatile, operable to store machine instructions from the processors and other processing mechanisms to receive, calculate, and control devices, as necessary. Machine instructions may be stored (e.g., stored instructions, stored machine instructions, stored steps) in any language or representation, including but not limited to machine code, assembly instructions, C, C++, C #, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium known or unknown.

Those versed in the art will readily appreciate that any of the steps or blocks listed may be rearranged or omitted. Any of the blocks may be performed in parallel or concurrently. In block 202, the method 200 begins. In block 204, a first coupling channel 128 is organized. The first coupling channel 128 may be organized according to the first channel path identifier. Communications therefore may be bound to a first virtual function 154 of the SR-IOV adapter 150. Adapter resources 152 are allocated to the first virtual function 154 as first virtual function resources 160. In block 206, access to the first coupling channel 128 is enabled by a hypervisor program 140 between the first guest operating system 120 and the first virtual function 154. In block 208, the hypervisor program 140 receives a teardown command associated with the first coupling channel 128. In block 210, the hypervisor program 140 initiates a reset of the first virtual function 154. The reset deallocates the first virtual function resources 160. The deallocation may be performed using realloc( ) free( ) or other resource allocation implements.

The reset may include maintaining second virtual function resources 162 associated with a second virtual function 156 and a second channel path identifier. Maintaining may include inaction or an affirmative action to maintain the second virtual function 156. A second coupling channel 129 may be organized. The second coupling channel 129 may correspond with the second channel path identifier. The second coupling channel 129 may be bound to second virtual function 156. The second virtual function 156 may correspond with adapter resources 152 as second virtual function resources 162.

Those versed in the art will readily appreciate that any number of guest operating systems 120, 130, coupling channels 128, 129, other types of communications channels, channel path identifiers, virtual functions 154, 156, and drivers 142, 144 may be used. Typical implementations may include numerous coupling channels 128, 129 to communicate or couple to other mainframe clusters 102.

It should be appreciated that a coupling channel may refer to any type of link channel associated with organizing communications between mainframe clusters 102. The coupling channels 128, 129 may be other types of logical link including channel command word (CCW) channels or queued direct input and output (QDIO).

Turning to FIG. 4, a process 300 for resetting virtual functions of an adaptor without contention is shown in accordance with one or more embodiments of the present invention. Similar to above, the process may take place on any implement, including any combination of processors, field programmable gate arrays (FPGA), or application specific integrated circuits (ASIC). The process 300 begins at block 302. In blocks 304, a command is issued or received to reset the virtual function. In block 306, a control block is deactivated. As shown, the operations may be performed in parallel without contention or minimized contention (e.g., queuing or sequential performance), as compared with managing adapter or port level resources and adding additional processing threads resulting additional time required to perform these operations. Such operations may include disabling ports, pulling port cables, deconfiguring ports, hot plugging an adapter, recovering the adapter, or any combination thereof. These potential advantages are not necessarily required of all embodiments, and additional advantages in a non-exhaustive list may further include simplified coding for manual processes, reduced contention, lower latency and conflicts, fewer parallel processes and resources consumed. These benefits are realized through, in one or more embodiments, features provided through deallocation of resources through the adapter. In block 308, the process may end or repeat.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process blocks described herein can be incorporated into a more comprehensive procedure or process having additional blocks or functionality not described in detail herein. By utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The instructions disclosed herein, which may execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing operating systems of a computer to organize communications channels associated with virtual functions comprising:

a hypervisor program stored on a digital storage device in computer readable form, the hypervisor program being operable upon execution by the computer to organize a first coupling channel according to a first channel path identifier bound to designated communications over a first virtual function of a single root input and output virtualization (SR-IOV) adaptor allocated according to first virtual function resources that support the first coupling channel, wherein the first virtual function is bound to a single coupling channel accessible via the hypervisor program, and wherein the single coupling channel is the first coupling channel; and the hypervisor program further operable upon execution by the computer to enable access by a first guest operating system to the first coupling channel and upon receipt of a teardown command associated with the first coupling channel to initiate a reset of the first virtual function that deallocates the first virtual function resources associated with the first virtual function, the deallocating performed independently of other virtual functions and their associated virtual function resources that are accessible via the hypervisor program, wherein the first coupling channel defines a communication path between the computer and a mainframe that has direct memory access (DMA) with the SR-IOV adapter, and the deallocating comprises deallocation of at least one mainframe resource.

2. The computer program product of claim 1, wherein the hypervisor program is further operable upon execution by the computer to organize a second coupling channel according to a second channel path identifier bound to designated communications over a second virtual function of the SR-IOV adaptor allocated according to second virtual function resources that support the second coupling channel, and upon receipt of the teardown command, initiate the reset of the first virtual function that deallocates the first virtual function resources associated the first virtual function while the second virtual function resources associated with the second virtual function are maintained.

3. The computer program product of claim 1, wherein the hypervisor program is further operable upon execution by the computer to organize a first plurality of virtual ports associated with the first coupling channel corresponding with the first channel path identifier and bound to the first virtual function.

4. The computer program product of claim 3, wherein the hypervisor program is further operable upon execution by the computer to initiate the reset of the first virtual function that deallocates the first virtual function resources associated the first plurality of virtual ports upon receipt of the teardown command.

5. The computer program product of claim 3, wherein the first plurality of virtual ports corresponds with a plurality of guest operating systems that includes the first guest operating system.

6. The computer program product of claim 3, wherein the hypervisor program is further operable upon execution by the computer to organize a second coupling channel according to a second channel path identifier bound to designated communications over a second virtual function of the SR-IOV adaptor allocated according to second virtual function resources that support the second coupling channel, and upon receipt of the teardown command, initiate the reset of the first virtual function that deallocates the first virtual function resources associated the first virtual function bound with the first plurality of virtual ports while the second virtual function resources are maintained.

7. The computer program product of claim 6, wherein the hypervisor program is further operable upon execution by the computer to organize a second plurality of virtual ports that includes the second coupling channel each of the second plurality of virtual ports defined with the second channel path identifier and bound to the second virtual function.

8. The computer program product of claim 7, wherein the hypervisor program is further operable upon execution by the computer to initiate the reset of the first virtual function to deallocate the first virtual function resources of the first virtual function associated with the first plurality of virtual ports while the second virtual function resources of the second virtual function associated with the second plurality of virtual ports are maintained.

9. The computer program product of claim 1, further comprising a control block file having a control block associated with the first coupling channel, and the reset comprises deactivating the control block associated with the first coupling channel.

10. A method of organizing communications channels associated with virtual functions, the method comprising:
organizing a first coupling channel according to a first channel path identifier bound to designated communications over a first virtual function of a single root input and output virtualization (SR-IOV) adaptor allocated according to first virtual function resources that support the first coupling channel, wherein the first virtual function is bound to a single coupling channel accessible via a hypervisor program, and wherein the single coupling channel is the first coupling channel; and
enabling access to the first coupling channel to a first guest operating system;
receiving a teardown command associated with the first coupling channel; and
initiating a reset of the first virtual function that deallocates the first virtual function resources associated with the first virtual function, the deallocating performed independently of other virtual functions and their associated virtual function resources that are accessible via the hypervisor program,
wherein the first coupling channel defines a communication path to a mainframe that has direct memory access (DMA) with the SR-IOV adapter, and the deallocating comprises deallocation of at least one mainframe resource.

11. The method of claim 10, further comprising organizing a second coupling channel according to a second channel path identifier bound to designated communications over a second virtual function of the SR-IOV adaptor allocated according to second virtual function resources that support the second coupling channel; and
maintaining the second virtual function resources associated with the second virtual function during the reset.

12. The method of claim 10, further comprising organizing a first plurality of virtual ports that includes the first coupling channel each defined with the first channel path identifier and bound to the first virtual function.

13. The method of claim 12, wherein the reset of the first virtual function is operable upon execution to deallocate the first virtual function resources associated the first plurality of virtual ports upon receipt of the teardown command.

14. The method of claim 12, wherein the first plurality of virtual ports corresponds with a plurality of guest operating systems that includes the first guest operating system.

15. The method of claim 12, further comprising organizing a second coupling channel according to a second channel path identifier bound to designated communications over a second virtual function of the SR-IOV adaptor allocated according to second virtual function resources that support the second coupling channel; and
maintaining the second virtual function resources associated with the second virtual function during the reset.

16. The method of claim 15, further comprising organizing a second plurality of virtual ports that includes the second coupling channel each defined with the second channel path identifier and bound to the second virtual function.

17. The method of claim 16, further comprising maintaining the second virtual function resources associated with the second plurality of virtual ports during the reset.

18. A system of interconnected computing systems organized to have distributed guest operating systems, the system comprising:
an adaptor cooperating through a physical function with the system, and cooperating through virtual functions with the distributed guest operating systems, a first virtual function of the virtual functions allocated according to first virtual function resources of the adaptor that support a first coupling channel defined by a first channel path identifier, and a second virtual function of the virtual functions allocated according to second virtual function resources of the adaptor that support a second coupling channel defined by a second channel path identifier; and
a hypervisor program stored on the system in computer readable form, the hypervisor program being operable upon execution to enable access by a first guest operating system and a second guest operating system of the distributed guest operating systems to the first coupling channel and the second coupling channel, wherein the first virtual function is bound to a single coupling channel accessible via the hypervisor program, and wherein the single coupling channel is the first coupling channel; and
upon receipt of a teardown command associated with the first coupling channel, initiate a reset of the first virtual function that deallocates the first virtual function resources associated the first virtual function, the deallocating performed independently of other virtual functions and their associated virtual function resources that are accessible via the hypervisor program,
wherein the system comprises a mainframe that has direct memory access (DMA) with the adapter via the first coupling channel and the deallocating comprises deallocation of at least one mainframe resource.

* * * * *